(12) United States Patent
Shiina

(10) Patent No.: US 12,046,992 B2
(45) Date of Patent: Jul. 23, 2024

(54) OVERHEAT PROTECTION CIRCUIT AND SWITCHING REGULATOR INCLUDING THE SAME

(71) Applicant: ABLIC Inc., Tokyo (JP)

(72) Inventor: Yoshiomi Shiina, Tokyo (JP)

(73) Assignee: Ablic Inc., Nagano (JP)

( * ) Notice: Subject to any disclaimer, the term of this patent is extended or adjusted under 35 U.S.C. 154(b) by 617 days.

(21) Appl. No.: 17/393,731

(22) Filed: Aug. 4, 2021

(65) Prior Publication Data

US 2022/0045602 A1 Feb. 10, 2022

(30) Foreign Application Priority Data

Aug. 7, 2020 (JP) .................................. 2020-134393

(51) Int. Cl.
*H02M 1/32* (2007.01)
*H02M 3/158* (2006.01)

(52) U.S. Cl.
CPC ........... *H02M 1/327* (2021.05); *H02M 3/158* (2013.01)

(58) Field of Classification Search
CPC ....... H02M 1/327; H02M 3/158; H02H 5/047
See application file for complete search history.

(56) References Cited

U.S. PATENT DOCUMENTS

2017/0264092 A1   9/2017   Kawano et al.
2017/0271985 A1*  9/2017   Kawano .................. H02M 1/32
2018/0048139 A1*  2/2018   Miyazawa ........... H02H 1/0007

FOREIGN PATENT DOCUMENTS

JP            2017-163741 A      9/2017

* cited by examiner

*Primary Examiner* — Jue Zhang
*Assistant Examiner* — Afework S Demisse
(74) *Attorney, Agent, or Firm* — Crowell & Moring LLP

(57) ABSTRACT

Provided is an overheat protection circuit with improved accuracy of overheat detection. The overheat protection circuit includes: an input terminal; an output terminal; a first transistor containing a first terminal, a second terminal, and a control terminal, the first transistor being switchable between ON and OFF; and a first NPN transistor containing a base to be connected to a node between the second terminal of the first transistor and the ground terminal, an emitter to be connected to the ground terminal, and a collector to be supplied with a constant current and connected to the output terminal, the first NPN transistor being switchable between ON and OFF in accordance with a voltage level of a reference voltage to be supplied to the base, the reference voltage having a temperature characteristic of having a temperature coefficient of zero or more.

15 Claims, 8 Drawing Sheets

OVERHEAT PROTECTION CIRCUIT AND SWITCHING REGULATOR INCLUDING THE SAME

RELATED APPLICATIONS

This application claims priority to Japanese Patent Application No. 2020-134393, filed on Aug. 7, 2020, the entire content of which is incorporated herein by reference.

BACKGROUND OF THE INVENTION

1. Field of the Invention

The present invention relates to an overheat protection circuit and switching regulator including the same.

2. Description of the Related Art

From the viewpoint of protecting an integrated circuit (IC) from an increase in temperature, ICs including an overheat protection circuit have been proposed. Further, from the viewpoint of facilitating a reduction in power consumption, some of the ICs including an overheat protection circuit are configured to perform what is called an intermittent operation (see, e.g., Japanese Patent Application Laid-open No. 2017-163741).

This intermittent operation includes, in view of an increase in temperature during operation of the IC, a period in which a detecting operation of the overheat protection circuit is temporarily stopped during non-operation of the IC with no increase in temperature.

In the conventional overheat protection circuit, a drop in voltage generated by a thermosensitive element at the time of the increase in temperature is detected. Further, during the intermittent operation (during operation stop), current supply to the thermosensitive element is cut to suppress the power consumption of the IC to a low level.

However, during the intermittent operation described above, because the voltage of the thermosensitive element is reduced, a transition may be made to a state (hereinafter referred to as "overheat detection state") in which it has been detected that the IC is in a state (hereinafter referred to as "overheat state") of having reached a prescribed temperature. In this case, even though the IC is not in the overheat state, it may be erroneously detected that the IC is in the overheat state, to thereby reduce accuracy of overheat detection.

SUMMARY OF THE INVENTION

The present invention has been made in view of the above-described circumstances, and an object thereof is to provide an overheat protection circuit with improved accuracy of overheat detection and a switching regulator including the overheat detection circuit.

According to an aspect of the present invention, there is provided an overheat protection circuit including: an input terminal; an output terminal; a first transistor which includes a first terminal to be supplied with a reference voltage, and a second terminal to be connected to a ground terminal, a control terminal, and which is configured to be switchable between an on state and an off state in accordance with a voltage level of an input voltage applied at the input terminal; and a first NPN transistor which includes a base to be connected to a node between the second terminal of the first transistor and the ground terminal, an emitter to be connected to the ground terminal, and a collector to be supplied with a constant current and connected to the output terminal, the first NPN transistor having a temperature coefficient of zero or more, and being switchable between an on state and an off state in accordance with a voltage level of a reference voltage to be supplied to the base.

According to another aspect of the present invention, there is provided a switching regulator configured to provide a desired output voltage based on an input voltage by a switching element, the switching regulator including: an output control circuit configured to provide a control signal to a control terminal of the switching element; and the overheat protection circuit being configured to supply a signal for controlling the output control circuit based on a signal based on the control signal to the output control circuit, the overheat protection circuit containing the input terminal, the output terminal, the first transistor, and the first NPN transistor.

According to at least one aspect of the present invention, an accuracy of overheat detection can be increased.

DETAILED DESCRIPTION OF THE PREFERRED EMBODIMENTS

Now, an overheat protection circuit and a switching regulator according to embodiments of the present invention are described with reference to the drawings. The overheat protection circuit according to the embodiments is connected to a protection target to be protected from overheat, such as an IC, to detect whether the temperature of the protection target is in an overheat state or not (normal state). Here, the overheat state refers to a state in which the temperature of the protection target is a set temperature or more.

Further, the overheat protection circuit according to the embodiments is configured to protect the protection target from the overheat state by supplying a signal based on an output voltage to a switch circuit configured to switch between an on state and an off state of the protection target or the protection target. Here, the protection target of the overheat protection circuit according to the embodiments is a switching regulator, and the switching regulator according to the embodiments is described first.

Figure 1:
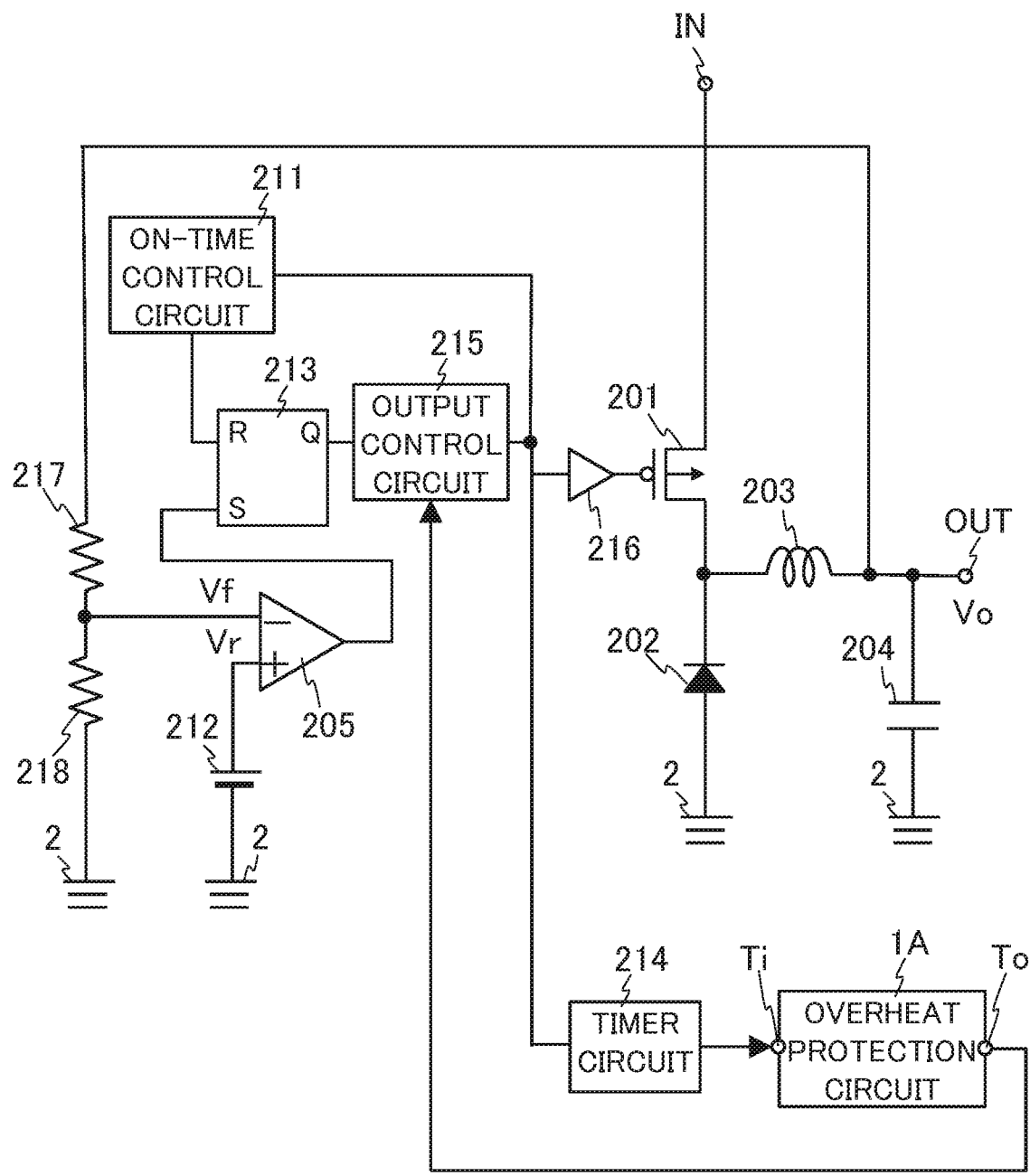
FIG. 1 is a circuit diagram of a switching regulator according to embodiments of the present invention.

FIG. 1 is a circuit diagram of a switching regulator 200 serving as an example for the switching regulator according to embodiments of the present invention.

The switching regulator 200 is configured to convert a voltage provided to an input terminal IN into a constant voltage, and provide the converted voltage as an output voltage Vo from an output terminal OUT. The switching regulator 200 includes a PMOS transistor 201 serving as a switching element, a diode 202, an inductor 203, an output capacitor 204, an error comparator 205, an on-time control circuit 211, a reference voltage circuit 212, an RS-FF circuit 213, a timer circuit 214, an output control circuit 215, a buffer circuit 216, resistors 217 and 218 forming a voltage divider circuit, and an overheat protection circuit 1A.

The resistors 217 and 218 are configured to provide a feedback voltage Vf corresponding to the output voltage Vo of the output terminal OUT to a connection point between the resistors 217 and 218. The reference voltage circuit 212 is configured to provide a reference voltage Vr to the error comparator 205. The error comparator 205 is configured to compare the feedback voltage Vf and the reference voltage Vr. If the feedback voltage Vf drops to the reference voltage or less, the error comparator 205 provides a set signal to the RS-FF circuit 213.

The on-time control circuit 211 is configured to provide a reset signal based on an output signal from an output terminal Q of the RS-FF circuit 213 to the RS-FF circuit 213. The RS-FF circuit 213 is configured to provide the output signal from the output terminal Q in accordance with the set signal supplied to a set terminal S and the reset signal supplied to a reset terminal R. The output control circuit 215 is configured to receive the signal from the RS-FF circuit 213 and control the PMOS transistor 201 via the buffer circuit 216 to generate the output voltage Vo.

The overheat protection circuit 1A monitors the temperature of the switching regulator 200. The overheat protection circuit 1A determines that the overheat state of the switching regulator 200 in response to an overheat of the switching regulator 200, and thereby provides a signal to the output control circuit 215. In the switching regulator 200, it is the PMOS transistor 201 configured to supply the output voltage Vo and an output current to the output terminal OUT that reaches the highest temperature. Having received the signal from the overheat protection circuit 1A, the output control circuit 215 is configured to supply a control signal to a gate serving as a control terminal of the PMOS transistor 201 via the buffer circuit 216 to cause the PMOS transistor 201 to transition to one of an on state and an off state.

For example, the PMOS transistor 201 transitions to the on state in response to the control signal provided from the output control circuit 215. In response to transitioning to the on state of the PMOS transistor 201, the timer circuit 214 starts timing. If prescribed time elapses from the start of timing, the on state is continued from the start of timing, that is, the overheat protection circuit 1A receives a voltage of a signal based on the control signal as an input voltage $V_{IN}$ (see FIG. 2), and provides an output voltage $V_{OUT}$ which is a signal for controlling the output control circuit 215 as described below. Subsequently, the overheat protection circuit according to the embodiments is described for each of the embodiments.

First Embodiment

Figure 2:
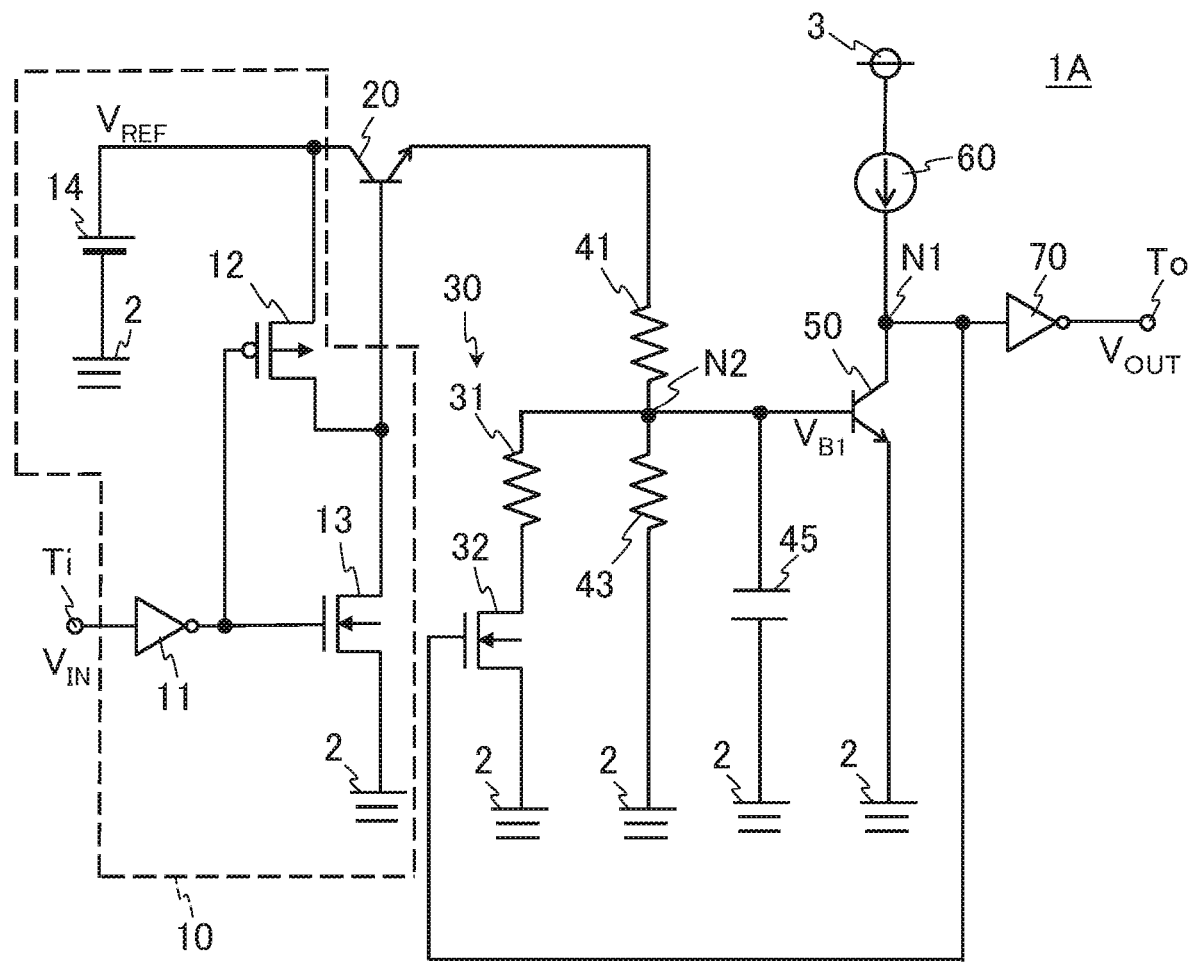
FIG. 2 is a circuit diagram of an overheat protection circuit according to a first embodiment of the present invention.

FIG. 2 is a circuit diagram of an overheat protection circuit 1A. The overheat protection circuit 1A is an example for an overheat protection circuit according to a first embodiment of the present invention.

The overheat protection circuit 1A includes an input circuit 10, an NPN transistor 20 serving as a first transistor or a second NPN transistor, a temperature hysteresis generation circuit 30, resistors 41 and 43, a capacitor 45, and an NPN transistor 50 serving as both a thermosensitive element and a comparator. The overheat protection circuit 1A also includes an input terminal Ti and an output terminal To.

The input circuit 10 includes an inverter 11, a PMOS transistor 12 serving as a first switching element, an NMOS transistor 13 serving as a second switching element, and a reference voltage circuit 14, for example, a band gap reference (BGR) circuit.

The inverter 11 contains an input terminal to be connected to the input terminal Ti, and an output terminal to be connected to each of a gate of the PMOS transistor 12 and a gate of the NMOS transistor 13.

The PMOS transistor 12 contains a source to be connected to a collector of the NPN transistor 20 serving as a first terminal of the first transistor and to an output terminal of the reference voltage circuit 14, and a drain to be connected to a base of the NPN transistor 20 serving as a control terminal of the first transistor and to a drain of the NMOS transistor 13. The NMOS transistor 13 contains a source to be connected to a ground terminal 2 configured to provide a ground potential.

The temperature hysteresis generation circuit 30 includes a resistor 31 and an NMOS transistor 32. The resistor 31 contains a first terminal to be connected to a second terminal of the resistor 41, and a second terminal to be connected to a drain of the NMOS transistor 32. The NMOS transistor 32 contains a gate to be connected to a node N1, and a source to be connected to the ground terminal 2. Here, the node N1 is a connection point among a collector of the NPN transistor 50, a second terminal of a constant current source 60, an input terminal of an inverter 70, and the gate of the NMOS transistor 32.

The resistor 41 serving as a first resistor contains a first terminal to be connected to an emitter of the NPN transistor 20 serving as a second terminal of the first transistor, and the second terminal to be connected to a first terminal of the resistor 43 and the first terminal of the resistor 31. The resistor 43 serving as a second resistor contains the first terminal to be connected to the second terminal of the resistor 41, and a second terminal to be connected to the ground terminal 2. The two resistors 41 and 43 which are connected in series with each other form the voltage divider circuit.

The capacitor 45 is connected between a node N2 and the ground terminal 2 and in parallel to the resistor 43. The capacitor 45 forms a low-pass filter together with the resistor 41. Here, the node N2 is a connection point among the second terminal of the resistor 41, the first terminal of the resistor 43, the first terminal of the resistor 31, and a base of the NPN transistor 50. Between the node N2 and the ground terminal 2, the temperature hysteresis generation circuit 30, the resistor 43, and the capacitor 45 are connected in parallel to one another.

The NPN transistor 50 serving as a first NPN transistor contains the collector to be connected to the node N1, an emitter to be connected to the ground terminal 2, and the base to be connected to the node N2.

The constant current source 60 contains a first terminal to be connected to a power supply terminal 3, and the second terminal to be connected to the node N1. The inverter 70 contains the input terminal to be connected to the node N1, and an output terminal to be connected to the output terminal To.

Next, actions and effects of the overheat protection circuit 1A are described.

In the overheat protection circuit 1A, a reference voltage $V_{REF}$ is supplied to the collector of the NPN transistor 20 by the input circuit 10. More specifically, the reference voltage circuit 14 is configured to generate the reference voltage $V_{REF}$, and supply the reference voltage $V_{REF}$ from the output terminal to the collector of the NPN transistor 20. The reference voltage $V_{REF}$ is a voltage with no temperature dependence, that is, a voltage that is insensitive to the temperature.

If a transition is made to a stage in which the temperature of the switching regulator 200 increases due to an increased load of the switching regulator 200 serving as the protection target, for example, the overheat protection circuit 1A acquires, as the input voltage $V_{IN}$, an overheat detection signal indicating that predetermined time has elapsed since the transition to the stage. As the overheat detection signal, it is possible to use a signal extractable from a node inside a circuit serving as the protection target, or a signal extractable from a node inside a circuit externally added to the protection target. In the switching regulator 200 exemplified in FIG. 1, an output signal from the timer circuit 214 is used as the overheat detection signal.

The input circuit 10 is configured to control the PMOS transistor 12 and the NMOS transistor 13 to be exclusively switched between a connected (on) state and a disconnected (off) state depending on a voltage level of the input voltage $V_{IN}$. The input circuit 10 is configured to switch a connection destination of the base of the NPN transistor 20 to the collector of the NPN transistor 20 or the ground terminal 2 by controlling the PMOS transistor 12 and the NMOS transistor 13 to be switched between the connected state and the disconnected state.

Through the path switching operation by the input circuit 10 described above, the NPN transistor 20 operates to be switchable between an on state and an off state depending on the voltage level of the input voltage $V_{IN}$.

To describe more specifically, in a case in which the switching regulator 200 connected to the overheat protection circuit 1A is in an operation stop state, that is, in a case in which the voltage level of the input voltage $V_{IN}$ is a low (hereinafter referred to as "L") level, the overheat protection circuit 1A is in a non-operating state. Under the non-operating state of the overheat protection circuit 1A, because the PMOS transistor 12 is turned off and the NMOS transistor 13 is turned on, the NPN transistor 20 is turned off.

Further, with the NPN transistor 20 being turned off, because a base voltage of the NPN transistor 50 which is an input voltage of the comparator is pulled down by the resistor 43, the NPN transistor 50 enters an off state. Consequently, in the voltage level of the input voltage $V_{IN}$, the voltage level being the L level, the NPN transistor 50 does not detect the overheat state of the switching regulator 200.

Meanwhile, in a case in which the switching regulator 200 connected to the overheat protection circuit 1A is in an operation state, that is, in a case in which the voltage level of the input voltage $V_{IN}$ is a high (hereinafter referred to as "H") level, the overheat protection circuit 1A is in the operation state. Under the operation state of the overheat protection circuit 1A, because the PMOS transistor 12 is turned on and the NMOS transistor 13 is turned off, the collector and the base of the NPN transistor 20 are short-circuited. Consequently, the NPN transistor 20 is turned on.

Under the on state of the NPN transistor 20, an emitter voltage of the NPN transistor 20 is provided to the voltage divider circuit formed of the resistor 41 and the resistor 43. The emitter voltage of the NPN transistor 20 is a voltage corresponding to the reference voltage $V_{REF}$ reduced by a base-emitter voltage $V_{BE20}$ of the NPN transistor 20. A divided voltage of the emitter voltage of the NPN transistor 20 is a voltage at the node N2, and serves as a reference voltage $V_{B1}$ for temperature detection. The reference voltage $V_{B1}$ is provided to the base of the NPN transistor 50.

The NPN transistor 50 provides a voltage corresponding to the reference voltage $V_{B1}$ and a temperature T. The output voltage of the NPN transistor 50 is inverted by the inverter 70, and the output voltage $V_{OUT}$ is provided from the output terminal To.

Figure 3:
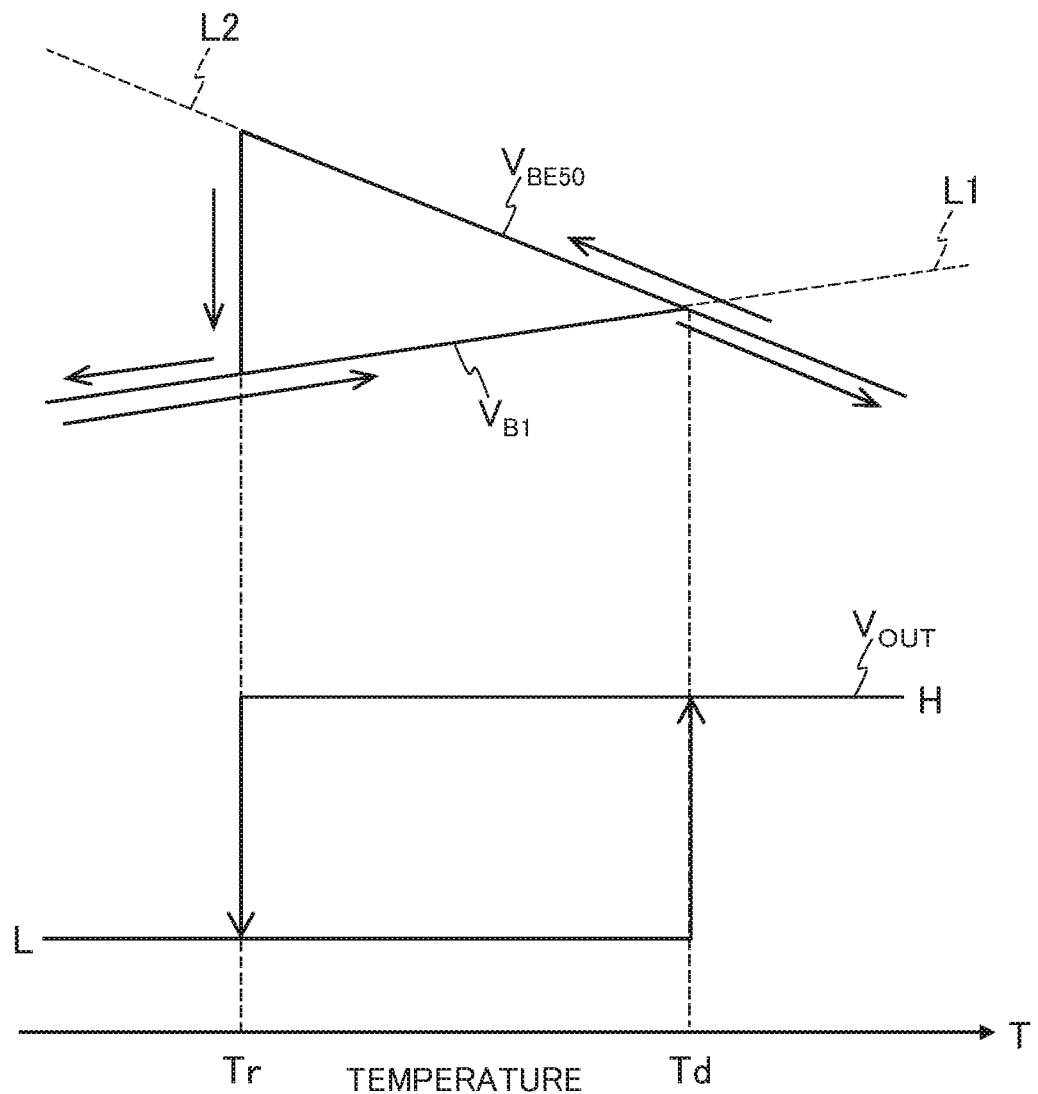
FIG. 3 is an explanatory graph for representing an outline of a temperature detecting operation of the overheat protection circuit according to the first embodiment.

FIG. 3 is an explanatory graph for representing an outline of a temperature detecting operation of the overheat protection circuit according to the first embodiment. More specifically, FIG. 3 is a relationship graph for representing relationships of the reference voltage and a threshold voltage with respect to the temperature T of the NPN transistor 50 serving as both the thermosensitive element and the comparator (above), and a relationship of the output voltage $V_{OUT}$ with respect to the temperature T (below).

Here, the threshold voltage of the NPN transistor 50 is a threshold voltage required for the NPN transistor 50 to transition to an on state, that is, a base-emitter voltage $V_{BE50}$. A temperature Tr is a temperature (hereinafter simply referred to as "cancellation temperature") at which an overheat detection state in which it is detected that the switching regulator 200 is in the overheat state is cancelled, that is, a temperature at which the overheat protection circuit 1A transitions from the overheat detection state to a non-overheat detection state. A temperature Td (>Tr) is a temperature (hereinafter simply referred to as "detection temperature") at which the overheat protection circuit 1A transitions from the non-overheat detection state to the overheat detection state.

Figure 4A:
FIG. 4A is a relationship graph for representing a relationship of an input voltage.
Figure 4B:
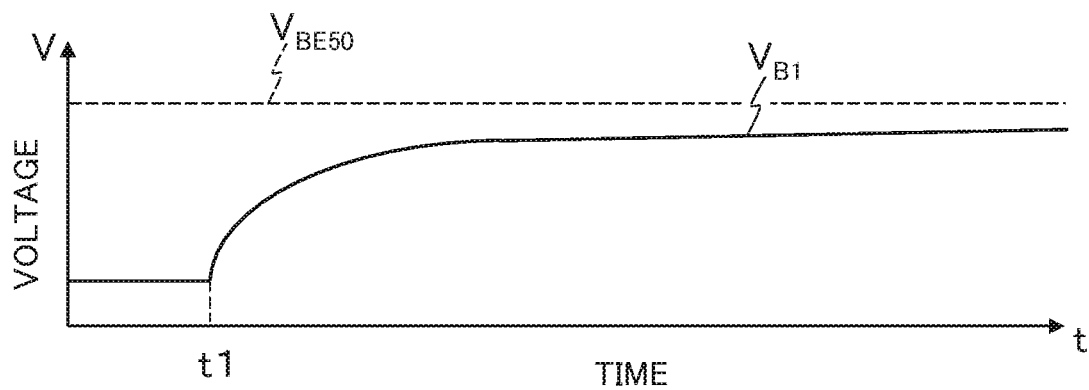
FIG. 4B is a relationship graph for representing a relationship of a reference voltage.
Figure 4C:
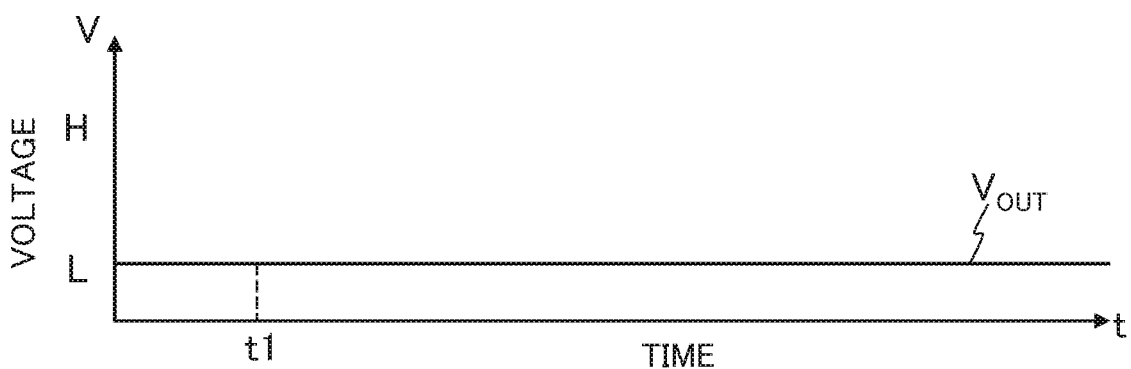
FIG. 4C is a relationship graph for representing a relationship of an output voltage with respect to time in a case in which a comparator of the overheat protection circuit according to the first embodiment is in an off state.

FIG. 4A, FIG. 4B, and FIG. 4C are relationship graphs for representing a relationship of the input voltage $V_{IN}$ with respect to a time t (progression with time of the input voltage $V_{IN}$), a relationship of the reference voltage $V_{B1}$ with respect to the time t (progression with time of the reference voltage $V_{B1}$), and a relationship of the output voltage $V_{OUT}$ with respect to the time t (progression with time of the output voltage $V_{OUT}$), respectively, in a case in which the NPN transistor 50 is in the off state. In FIG. 4A, FIG. 4B, and FIG. 4C, the horizontal line represents the time t, and a common time range is illustrated.

The detection of an overheat temperature of the overheat protection circuit 1A is performed by the NPN transistor 50. Under the off state of the NPN transistor 50, the overheat protection circuit 1A is in the non-overheat detection state. If the voltage level of the input voltage $V_{IN}$ transitions from the L level to the H level at the time t=t1 after t1 (>0) has elapsed from a reference time (t=0) (see FIG. 4A), the NPN transistor 20 transitions from the off state to the on state.

Under the on state of the NPN transistor 20, the reference voltage $V_{B1}$ is provided to the base of the NPN transistor 50.

In the case in which the NPN transistor 50 is in the off state, the reference voltage $V_{B1}$ is set to be lower than the threshold voltage required for the NPN transistor 50 to transition to the on state, that is, the base-emitter voltage $V_{BE50}$ (see FIG. 4B). Being filtered by the resistor 41 and the capacitor 45, the reference voltage $V_{B1}$ is reduced in noise superimposed thereon and rises smoothly.

Here, if a temperature characteristic of the base-emitter voltage $V_{BE20}$, $V_{BE50}$ of the NPN transistor 20, 50 is set to −2 mV/° C., and if resistance values of the resistors 41 and 43 are represented by $R_{41}$ and $R_{43}$, respectively, based on the above-described voltage relationships, a temperature characteristic/c of the reference voltage $V_{B1}$ is obtained by the following equation (1).

$$\Delta V_{B1}/\Delta T = (V_{REF} - V_{BE20} \times (-2\text{mV}/°\text{ C.})) \times R_{41}/(R_{41}+R_{43}) \quad (1)$$
$$= V_{REF} + V_{BE20} \times (2\text{mV}/°\text{ C.}) \times R_{41}/(R_{41}+R_{43})$$

From the right-hand side of the equation (1), the temperature characteristic of the reference voltage $V_{B1}$ has a positive temperature coefficient, and is expressed by a straight line LL In other words, the reference voltage [=increases along with an increase in temperature. Under the non-overheat detection state in which the temperature of the switching regulator 200 has not reached the detection temperature Td, the reference voltage $V_{B1}$ does not exceed the base-emitter voltage $V_{BE50}$ (and satisfies $V_{B1} < V_{BE50}$), and the output voltage $V_{OUT}$ maintains an L level (see FIG. 4C).

Figure 5A:
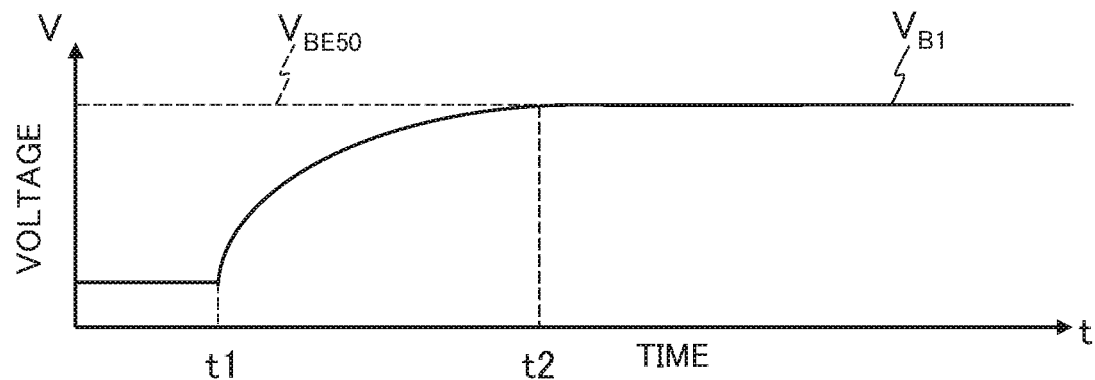
FIG. 5A is a relationship graph for representing a relationship of the reference voltage.
Figure 5B:
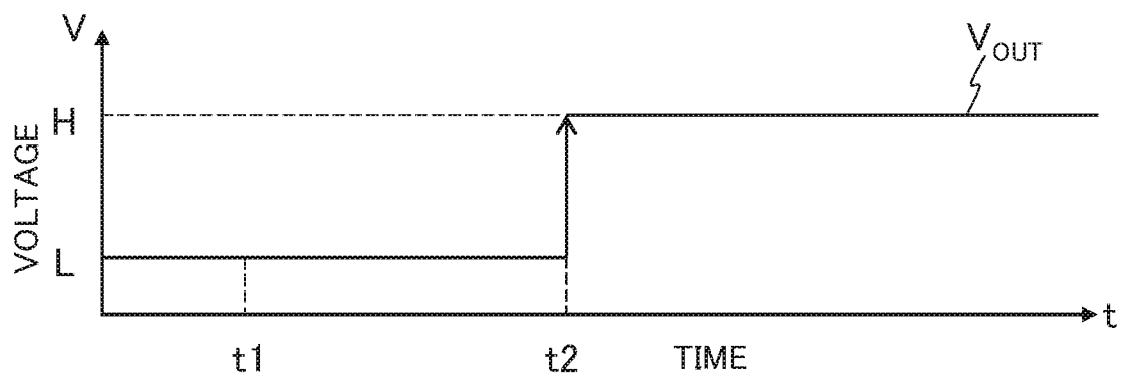
FIG. 5B is a relationship graph for representing the output voltage with respect to time in a case in which the comparator of the overheat protection circuit according to the first embodiment has turned to an on state from the off state.

FIG. 5A and FIG. 5B are relationship graphs for representing a relationship of the reference voltage $V_{B1}$ with respect to the time t (progression with time of the reference voltage $V_{B1}$), and a relationship of the output voltage $V_{OUT}$ with respect to the time t (progression with time of the output voltage $V_{OUT}$), respectively, in a case in which the NPN transistor 50 of the overheat protection circuit 1A transitions from the off state to the on state. In FIG. 5A and FIG. 5B, the horizontal line represents the time t, and a common time range is illustrated. Further, the time range illustrated in FIG. 5A and FIG. 5B includes the time range illustrated in FIG. 4A, FIG. 4B, and FIG. 4C.

Further, when the time elapses to reach a time t2 (>t1>0), the NPN transistor 50 transitions from the off state to the on state. In response to transitioning to the on state of the NPN transistor 50, the overheat protection circuit 1A transitions to the overheat detection state of the switching regulator 200. In the on state of the NPN transistor 50, the reference voltage $V_{B1}$ is clamped to the base-emitter voltage $V_{BE50}$ of the NPN transistor 50 (see FIG. 5A). Here, as described above, the base-emitter voltage $V_{BE50}$ has a negative temperature coefficient, and is expressed by a straight line L2 (see FIG. 3). In other words, the reference voltage $V_{B1}$ progresses in accordance with the straight line L2 in a temperature range of the detection temperature Td or more.

Further, in response to transitioning to the on state of the NPN transistor 50, the output voltage $V_{OUT}$ is inverted from the L level to the H level (see FIG. 5B). The output voltage $V_{OUT}$ switching the NMOS transistor 32 between an on state and an off state gives a hysteresis to the temperature.

Meanwhile, the hysteresis given to the temperature, even if the temperature of the switching regulator 200 falls below the detection temperature Td, enables the NPN transistor 50 to keep from transitioning to the off state. The reference voltage $V_{B1}$ progresses in accordance with the straight line L2. If the temperature of the switching regulator 200 further falls to reach the cancellation temperature Tr, the NPN transistor 50 transitions to the off state. In response to transitioning to the off state of the NPN transistor 50, the output voltage $V_{OUT}$ transitions to the L level.

Under the off state of the NPN transistor 20, electric charges stored in the capacitor 45 are discharged by the resistor 43. With the reference voltage $V_{B1}$ being pulled down by the resistor 43, the NPN transistor 50 transitions from the on state to the off state. In other words, the overheat protection circuit 1A returns from the overheat detection state to the non-overheat detection state. Because the NPN transistor 20 and 50 enters the off state, the overheat detection of the switching regulator 200 is stopped.

According to the overheat protection circuit 1A, with the reference voltage $V_{B1}$ having the positive temperature coefficient, a direction of change of the reference voltage $V_{B1}$ and a direction of change of the temperature coincide. Consequently, according to the overheat protection circuit 1A, in the stage in which the temperature is lowered, it is possible to prevent erroneous transition to the overheat detection state. With the reduction in erroneous detection of the overheat detection state, accuracy of overheat detection can be improved.

Further, according to the overheat protection circuit 1A, with the resistor 41 and the capacitor 45 forming the low-pass filter, the noise superimposed on the reference voltage $V_{B1}$ can be filtered by the resistor 41 and the capacitor 45 without additional provision of a low-pass filter in the previous stage of the base of the NPN transistor 50. Consequently, the noise superimposed on the reference voltage $V_{B1}$ can be reduced, and the erroneous detection of the overheat detection state caused by the noise can be reduced without the additional provision of the low-pass filter in the previous stage of the base of the NPN transistor 50.

Here, the elimination of the requirement of the separate low-pass filter in the previous stage of the base of the NPN transistor 50 is advantageous in that a base current of the NPN transistor 50 is not limited by high impedance of the low-pass filter. In other words, the elimination is advantageous in that the control on the operation of the NPN transistor 50 is not complicated.

Further, according to the overheat protection circuit 1A, because the NPN transistor 20 and 50 enter the off state under the non-operating state of the overheat protection circuit 1A, the overheat protection circuit 1A can stop the overheat detection of the switching regulator 200, and reduce the current consumption in the overheat protection circuit 1A to zero.

Second Embodiment

Figure 6:
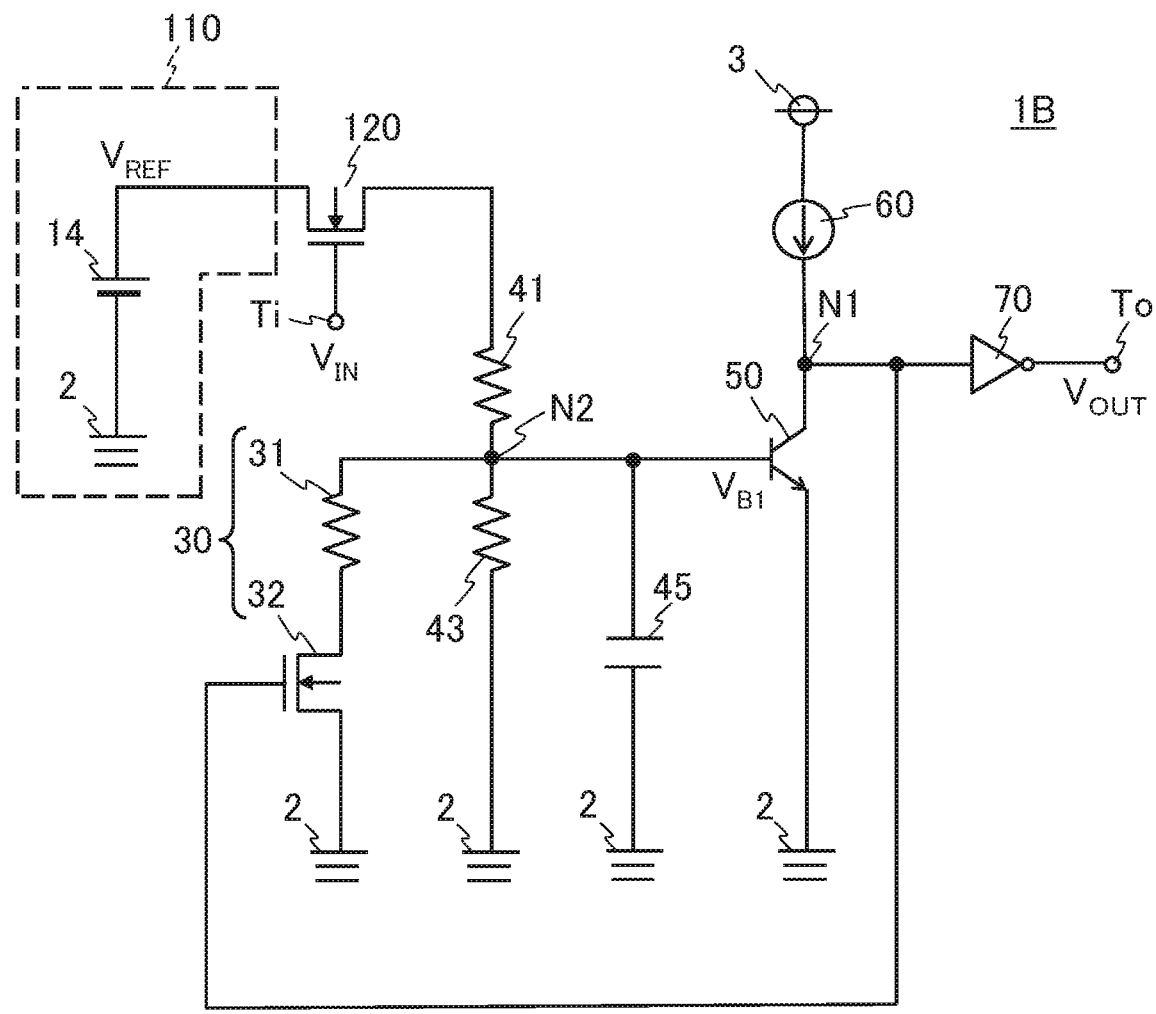
FIG. 6 is a circuit diagram of an overheat protection circuit according to a second embodiment of the present invention.

FIG. 6 is a circuit diagram of an overheat protection circuit 1B. The overheat protection circuit 1B is an example of an overheat protection circuit according to a second embodiment of the present invention.

The overheat protection circuit 1B is different from the overheat protection circuit 1A in that the overheat protection circuit 1B includes an input circuit 110 and an NMOS transistor 120 instead of the input circuit 10 and the NPN transistor 20, but is not substantially different from the overheat protection circuit 1A otherwise. Consequently, in the second embodiment, the input circuit 110 and the NMOS transistor 120 are mainly described, and a duplicate description of the first embodiment is omitted.

The input circuit 110 is obtained by omitting the inverter 11, the PMOS transistor 12, and the NMOS transistor 13 from the input circuit 10. In other words, the input circuit 110 includes the reference voltage circuit 14.

The NMOS transistor 120 serving as the first transistor contains a drain serving as a first terminal, a gate serving as a control terminal, and a source serving as a second terminal. The drain of the NMOS transistor 120 is connected to the output terminal of the reference voltage circuit 14. The gate of the NMOS transistor 120 is connected in series to the input terminal Ti. The source of the NMOS transistor 120 is connected to the ground terminal 2 via the resistors 41 and 43.

Through the path switching operation by the input circuit 10 described above, the NPN transistor 20 operates to be switchable between an on state and an off state depending on the voltage level of the input voltage VIN.

The resistor 41 and the resistor 43 connected in series to each other divides a gate-source voltage of the NMOS transistor 120, that is, the input voltage $V_{IN}$.

In the overheat protection circuit 1B configured as described above, the reference voltage $V_{B1}$ has the temperature characteristic that is different from the temperature characteristic of the reference voltage $V_{B1}$ of the overheat protection circuit 1A, but the output voltage $V_{OUT}$ is similar to the output voltage $V_{OUT}$ of the overheat protection circuit 1A. In other words, the output voltage $V_{OUT}$ of the overheat protection circuit 1B has a temperature characteristic having a hysteresis characteristic with respect to the temperature.

Specifically, the temperature characteristic of the reference voltage $V_{B1}$ of the overheat protection circuit 1B has a constant value with respect to the temperature under the state in which the input voltage $V_{IN}$ is at the L level, that is, the NPN transistor 50 has not detected overheat. In other words, the straight line L1 (see FIG. 3) corresponding to the temperature coefficient has a slope of zero (0).

Actions and effects of the overheat protection circuit 1B configured as described above and the switching regulator including the overheat protection circuit 1B are similar to the actions and effects of the overheat protection circuit 1A and the switching regulator 200 including the overheat protection circuit 1A.

In the embodiments described above, the example in which the overheat protection circuit 1A, 1B is applied to overheat protection of the IC, for example, has been described, but the application is not limited to the overheat protection. The overheat protection circuit 1A, 1B may be applied as an overheat detection circuit that does not perform an overheat protection operation. Further, in the embodiments described above, the example of the switching regulator has been described as an example of the protection target, but the present invention is not limited thereto. As long as the voltage indicating the increase in temperature can be extracted from the protection target, the present invention is also applicable to a circuit other than the switching regulator, for example, a series regulator.

Figure 7A:
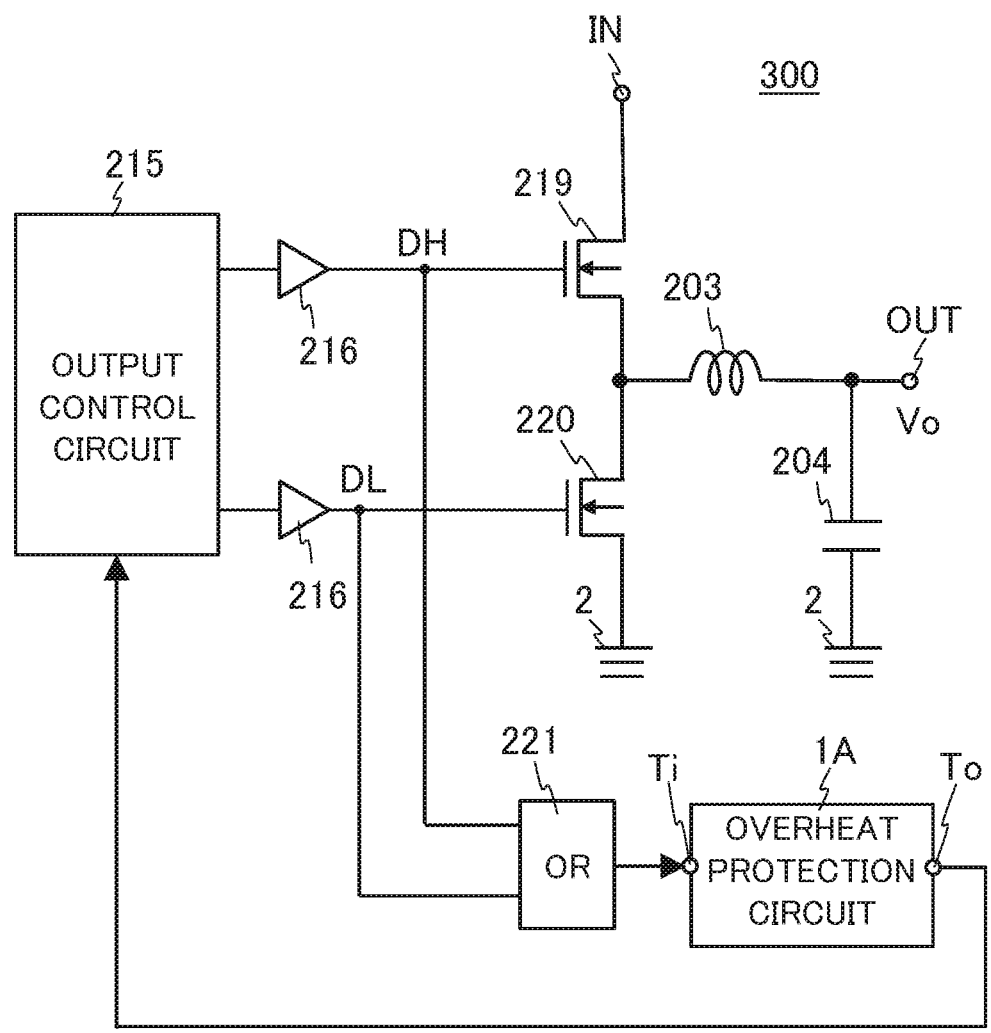
FIG. 7A is a circuit diagram for illustrating another configuration example of the switching regulator according to the embodiments.

Further, also in regard to the switching regulator, without being limited to the switching regulator 200 including the error comparator 205, the overheat protection circuit according to the embodiments such as the overheat protection circuit 1A is also applicable to a switching regulator 300 (see FIG. 7A) not including the error comparator 205.

Figure 7B:
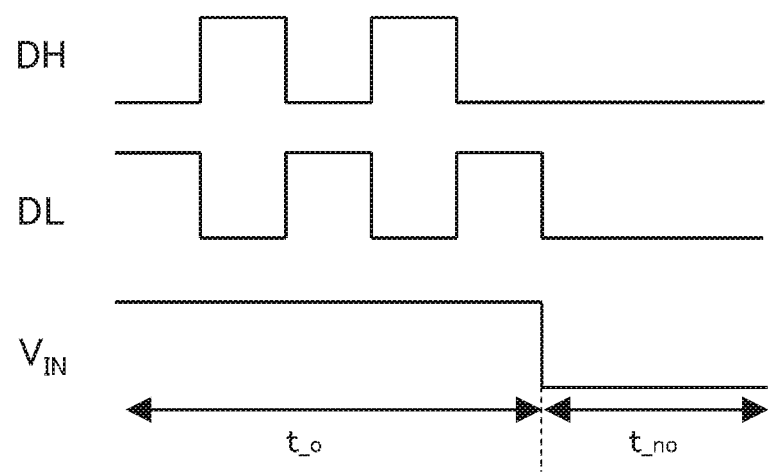
FIG. 7B is an explanatory chart for illustrating changes of voltages DH, DL, and $V_{IN}$ with respect to time.

The switching regulator 300 includes NMOS transistors 219 and 220 serving as a switching element, an inductor 203, an output capacitor 204, an output control circuit 215, a buffer circuit 216, an OR circuit 221, and an overheat protection circuit 1A. A voltage (hereinafter referred to as "voltage DH") at a node DH illustrated in FIG. 7A and a voltage (hereinafter referred to as "voltage DL") at a node DL illustrated in FIG. 7A transition periodically to different voltage levels (see FIG. 7B). Here, time spans t_o and t_no illustrated in FIG. 7B each represents an operation state and a non-operation state. In the operation state in which the overheat protection circuit 1A is in an operation, one is at an L level and the other is at an H level (see FIG. 7B). Further, in the non-operating state, the voltage levels of the voltage DH and the voltage DL are both the L level.

The present invention is not limited to the above-described embodiments, and can be implemented in various forms other than the above-described embodiments in its implementation stage. Various omissions, replacements, and changes may be made thereto without departing from the gist of the invention. The above-described embodiments and their modifications are included in the scope and gist of the invention, and are also included in the scope of the invention and its equivalents described in the appended claims.

What is claimed is:

1. An overheat protection circuit, comprising:
an input terminal;
an output terminal;
a first transistor which includes a first terminal to be supplied with a reference voltage, and a second terminal to be connected to a ground terminal, a control terminal, and which is configured to be switchable between an on state and an off state in accordance with a voltage level of an input voltage applied at the input terminal; and
a first NPN transistor which includes a base to be connected to a node between the second terminal of the first transistor and the ground terminal, an emitter to be connected to the ground terminal, and a collector to be supplied with a constant current and connected to the output terminal, the first NPN transistor having a temperature coefficient of zero or more, and being switchable between an on state and an off state in accordance with a voltage level of a reference voltage to be supplied to the base.

2. The overheat protection circuit according to claim 1, further comprising an input circuit including a first switching element and a second switching element which are controlled to be exclusively switched between a connected state and a disconnected state in accordance with the voltage level of the input voltage,
wherein the first transistor is a second NPN transistor including a base serving as the control terminal, a collector serving as the first terminal, and an emitter serving as the second terminal,
wherein the first switching element is connected between the base and the collector of the second NPN transistor, and
wherein the second switching element is connected between the base of the second NPN transistor and the ground terminal.

3. The overheat protection circuit according to claim 2, further comprising a first resistor connected between the second terminal of the first transistor and the node, and a second resistor to be connected between the node and the ground terminal.

4. The overheat protection circuit according to claim 3, further comprising at least one component to be connected between the node and the ground terminal and in parallel to the second resistor, the at least one component being selected from a capacitor and a temperature hysteresis generation circuit.

5. A switching regulator configured to provide a desired output voltage based on an input voltage by a switching element, the switching regulator comprising:
an output control circuit configured to provide a control signal to a control terminal of the switching element; and
the overheat protection circuit of claim 2,
the overheat protection circuit being configured to supply a signal for controlling the output control circuit based on a signal based on the control signal to the output control circuit.

6. The overheat protection circuit according to claim 1, wherein the first transistor is an NMOS transistor including a gate connected to the input terminal, the gate serving as the control terminal, a drain serving as the first terminal, and a source serving as the second terminal.

7. The overheat protection circuit according to claim 6, further comprising a first resistor connected between the second terminal of the first transistor and the node, and a second resistor to be connected between the node and the ground terminal.

8. The overheat protection circuit according to claim 1, further comprising a first resistor connected between the second terminal of the first transistor and the node, and a second resistor to be connected between the node and the ground terminal.

9. The overheat protection circuit according to claim 7, further comprising at least one component to be connected between the node and the ground terminal and in parallel to the second resistor, the at least one component being selected from a capacitor and a temperature hysteresis generation circuit.

10. The overheat protection circuit according to claim 8, further comprising a capacitor to be connected between the node and the ground terminal and in parallel to the second resistor.

11. The overheat protection circuit according to claim 8, further comprising a temperature hysteresis generation circuit to be connected between the node and the ground terminal and in parallel with the second resistor.

12. A switching regulator configured to provide a desired output voltage based on an input voltage by a switching element, the switching regulator comprising:
an output control circuit configured to provide a control signal to a control terminal of the switching element; and
the overheat protection circuit of claim 1,
the overheat protection circuit being configured to supply a signal for controlling the output control circuit based on a signal based on the control signal to the output control circuit.

13. The switching regulator according to claim 12, wherein the first transistor including a gate connected to the input terminal, the gate serving as the control terminal, a drain serving as the first terminal, and a source serving as the second terminal.

14. The switching regulator according to claim 12, wherein the overheat protection circuit further includes a first resistor connected between the second terminal of the first transistor and the node, and a second resistor to be connected between the node and the ground terminal.

15. The switching regulator according to claim 14, wherein the overheat protection circuit further includes at least one component to be connected between the node and the ground terminal and in parallel to the second resistor, the at least one component being selected from a capacitor and a temperature hysteresis generation circuit.

\* \* \* \* \*